(12) United States Patent
Hoover et al.

(10) Patent No.: US 11,599,920 B2
(45) Date of Patent: Mar. 7, 2023

(54) METHOD AND SYSTEM FOR DETERMINING AN ACTUAL COST OWNERSHIP

(71) Applicant: Capital One Services, LLC, McLean, VA (US)

(72) Inventors: Jason Hoover, Grapevine, TX (US); Avid Ghamsari, Plano, TX (US); Qiaochu Tang, The Colony, TX (US); Geoffrey Dagley, McKinney, TX (US); Micah Price, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/370,471

(22) Filed: Mar. 29, 2019

(65) Prior Publication Data
US 2020/0311782 A1    Oct. 1, 2020

(51) Int. Cl.
| | |
|---|---|
| G06Q 30/02 | (2012.01) |
| G07C 5/00 | (2006.01) |
| G06Q 10/00 | (2012.01) |
| G06Q 30/06 | (2012.01) |
| G06Q 30/0283 | (2023.01) |
| G06Q 10/20 | (2023.01) |
| G06Q 30/0601 | (2023.01) |

(52) U.S. Cl.
CPC ......... G06Q 30/0283 (2013.01); G06Q 10/20 (2013.01); G06Q 30/0623 (2013.01); G07C 5/008 (2013.01)

(58) Field of Classification Search
CPC .............. G06Q 30/0283; G06Q 10/20; G06Q 30/0623; G06Q 30/0206; G07C 5/008
USPC ........................................................ 705/7.35
See application file for complete search history.

(56) References Cited

U.S. PATENT DOCUMENTS

| | | | |
|---|---|---|---|
| 7,636,676 B1 | 12/2009 | Wolery et al. | |
| 8,055,536 B1 * | 11/2011 | Olaiya | G06F 21/6263 705/14.1 |
| 8,738,277 B1 * | 5/2014 | Kurosawa | G01C 21/3679 701/123 |

(Continued)

OTHER PUBLICATIONS

Durkay, "Comparison of Toll Rates by State and Regional Tolling Authorities" (Feb. 20, 2013) (captured using Wayback on Jun. 9, 2014 at <http://web.archive.org/web/20140609053120/http://www.ncsl.org/documents/transportation/NCSL_Comparison_of_Tolling_Rates_Feb_2013.pdf>) (Year: 2014).*

(Continued)

*Primary Examiner* — Jeff Zimmerman
*Assistant Examiner* — Brian A Tallman
(74) *Attorney, Agent, or Firm* — Bookoff McAndrews, PLLC

(57) ABSTRACT

A computer-implemented method for determining an actual cost of ownership of a purchase product may include determining a baseline value of the purchase product, and receiving usage information representative of usage of a user product from a computing device in communication with the user product. The purchase product and the user product may belong to a same class of products. The method also may include determining a user cost component based on the received usage information, and determining an actual cost of ownership of the purchase product based on at least the baseline value and the user cost component.

19 Claims, 4 Drawing Sheets

(56) References Cited

U.S. PATENT DOCUMENTS

| | | | |
|---|---|---|---|
| 9,727,905 B2 | 8/2017 | Swinson et al. | |
| 10,332,208 B1* | 6/2019 | Loo .................. | G06Q 40/08 |
| 2004/0128226 A1 | 7/2004 | Kwan | |
| 2011/0112717 A1* | 5/2011 | Resner .................. | G07C 5/085 |
| | | | 701/31.4 |
| 2011/0270486 A1* | 11/2011 | Stevens .................. | G06Q 10/04 |
| | | | 701/31.4 |
| 2012/0197484 A1* | 8/2012 | Nath .................. | G08G 1/20 |
| | | | 701/32.4 |
| 2013/0297097 A1* | 11/2013 | Fischer .................. | G06F 17/00 |
| | | | 701/1 |
| 2015/0100506 A1 | 4/2015 | Binion et al. | |
| 2015/0134427 A1* | 5/2015 | Borras .................. | H04W 4/48 |
| | | | 705/13 |
| 2015/0348058 A1* | 12/2015 | Liu .................. | G06Q 30/0201 |
| | | | 705/14.49 |
| 2016/0055466 A1* | 2/2016 | Du .................. | G01S 19/13 |
| | | | 705/13 |
| 2020/0172112 A1* | 6/2020 | Kawashima .......... | B60W 50/08 |

OTHER PUBLICATIONS

Natalie; Rias 'A guide to multi car insurance' <https://www.rias.co.uk/news-and-guides/tips-and-guides/a-guide-to-multi-car-insurance/> (Jun. 20, 2018). (Year: 2018).*

Quarters, Cindy; 'How to Budget for Car Maintenance' <https://budgeting.thenest.com/budget-car-maintenance-20519.html> (<http://web.archive.org/web/20171021181656/https://budgeting.thenest.com/budget-car-maintenance-20519.html> captured on Oct. 21, 2017 using Wayback Machine). (Year: 2017).*

Kamin, Mir "A Driving Contract For Teens" <https://alphamom.com/parenting/driving-contract-teen-parent-agreement/> (<http://web.archive.org/web/20180203070725/https://alphamom.com/parenting/driving-contract-teen-parent-agreement/> captured on Feb. 3, 2018 using Wayback Machine) (Year: 2018).*

New Hampshire Dept of Safety DMV "Purchasing or Selling a Vehicle" <https://www.nh.gov/safety/divisions/dmv/title/purchase-sell.htm> (<http://web.archive.org/web/20170421195247/https://www.nh.gov/safety/divisions/dmv/title/purchase-sell.htm> captured on Apr. 21, 2017 using Wayback Machine) (Year: 2017).*

Edmunds "True Cost to Own (TCO)" webpage <https://www.edmunds.com/tco.html> (<http://web.archive.org/web/20180309001732/https://www.edmunds.com/tco.html> captured on Mar. 9, 2018 using Wayback Machine). (Year: 2018).*

* cited by examiner

METHOD AND SYSTEM FOR DETERMINING AN ACTUAL COST OWNERSHIP

TECHNICAL FIELD

Various embodiments of the present disclosure relate generally to cost evaluation, and, more particularly, to determining an actual cost of ownership.

BACKGROUND

Merchants that sell items that have a high cost to operate and maintain derive benefits from providing a potential purchaser with information regarding costs associated with the purchase of the item. These costs may cover a particular period of time. Such items, including, for example, vehicles or houses, may be listed by aggregation services that provide cost information beyond the purchase price. Financiers can also benefit from presenting a representation of costs to allow their customers to more accurately plan large purchases.

A cost of ownership for the purchase of an item may be based on a few estimates that represent an average operating cost. For example, the average insurance cost for a typical item over a period of time may be provided. Such estimates may be based on considerably generalized information. Actual user information is absent from these estimates, as is objective information reflecting the user's use of a similar item.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

In one aspect, a computer-implemented method for determining an actual cost of ownership of a purchase product may include determining a baseline value of the purchase product, and receiving usage information representative of usage of a user product from a computing device in communication with the user product, the purchase product and the user product belonging to a same class of products. The method may also include determining a user cost component based on the received usage information, and determining an actual cost of ownership of the purchase product based on at least the baseline value and the user cost component.

In another aspect, a computer-implemented method for determining an actual cost of ownership of a purchase product may include receiving information from a user product indicative of an identity of the user product from a user device in communication with the user product, the user product and the purchase product belonging to a same class of products, and identifying the user product based on the information received from the user product. The method may also include measuring usage information associated with an operation of the user product, and determining the actual cost of ownership of the purchase product based on at least a baseline value and the measured usage information.

In another aspect, a system for determining an actual cost of ownership of a purchase product may include a memory storing instructions and at least one processor executing the instructions to perform a process including determining a baseline value of the purchase product, and receiving usage information representative of usage of a user product from at least one of an accelerometer, a global positioning system receiver, or a radio, the purchase product and the user product belonging to a same class of products. The process may also include determining a plurality of user cost components based on the received usage information, and determining the actual cost of ownership of the purchase product based on at least the baseline value and the plurality of user cost components, wherein the plurality of user cost components are determined based on at least one of a geographic location, a route, an acceleration, and a deceleration of the user product.

According to additional aspects of the disclosure, a non-transitory computer-readable medium stores instructions that, when executed by one or more processors, cause the one or more processors to perform the aforementioned computer-implemented method or the operations that the aforementioned computer systems are configured to perform.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

In the following description, embodiments will be described with reference to the accompanying drawings. As will be discussed in more detail below, in various embodiments, data such as user usage information and/or user activity information may be used to determine an actual cost of ownership (ACO) for one or more purchase products which may be available for purchase. The ACO may be displayed on a display of a user device or otherwise presented to a user, and/or may be used to determine whether one or more potential products available to purchase are suitable for the user.

Figure 1:
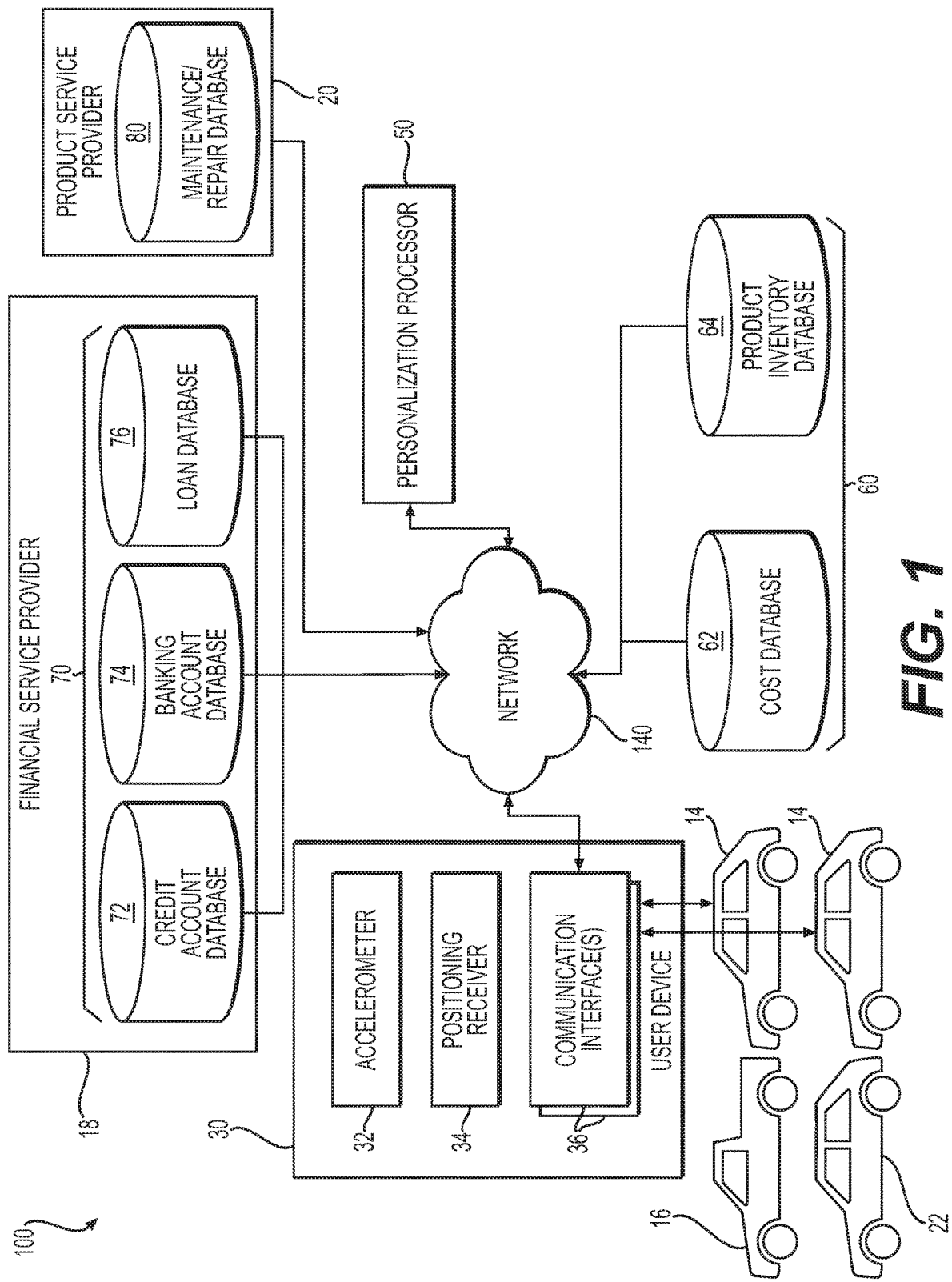
FIG. 1 depicts an exemplary system infrastructure, according to one or more embodiments.

FIG. 1 is a diagram depicting an example of a system environment 100 according to one or more embodiments of the present disclosure. The system environment 100 may include computing devices, such as a user device 30 and a personalization processor 50 for determining an ACO. User device 30 and personalization processor 50 may be in communication with each other via network 140. Additionally, system environment 100 may include one or more user products 14, industry database 60, user account database 70, and maintenance/repair database 80. Industry database 60 may be one or more databases including a cost database 62 and a product inventory database 64. User account database 70 may be one or more databases of a financial service provider 18, and may include credit account database 72, banking account database 74, and loan database 76. Maintenance/repair database 80 may be one or more databases of a product service provider 20. Alternatively, industry database 60 and maintenance/repair database 80 may belong to (and/or included within) financial service provider 18. Network 140 may facilitate communication between personalization processor 50, user device 30, industry database 60, user account database 70, and maintenance/repair database 80.

User product 14 may be a product owned, operated, or otherwise associated with a user. In one example, user product 14 may be a product with significant operational costs, such as a home or a vehicle. In the example illustrated in FIG. 1, user product 14 may be a vehicle that is regularly operated by the user. As shown in FIG. 1, multiple user products 14 may be associated with a user, each of which may communicate with user device 30. Each piece of information measured by user device 30 in one user product 14 may also be measured in a second user product 14. The measured information from a plurality of user products 14 may thereby be used to determine an ACO for those user products 14 and/or for a purchase product. A non-user product 16 represents a product which the user does not operate, but which may be associated by the user. For example, non-user product 16 may represent vehicles in which the user is a passenger. User device 30 is configured to determine an identity of user products 14 and determine that product 16 is a non-user product, and thereby avoid measuring usage information when a user is, for example, a passenger in non-user product 16, as will be described in further detail below.

A purchase product may belong to the same classification or class of products as user product 14. In the example illustrated in FIG. 1, user product 14 is a vehicle. Accordingly, the purchase product, like the user product 14, may also be a vehicle (e.g., belong to a same class of products). More specific subclasses may include cars, trucks, sport-utility vehicles, electric vehicles, etc. Alternatively, the user product 14 and purchase product may belong to a same class of real estate (e.g., single-family homes, condominiums, offices, etc.).

User device 30 may be a computer system such as a mobile computer or cellular phone that is operated by a user. User device 30 may include memory, one or more processors, communication interfaces, input devices, and output devices, as will be described in further detail below with reference to FIG. 4. User device 30 may include an accelerometer 32, a positioning receiver 34, such as a global positioning receiver or other geo-location device, and one or more communication interfaces 36. Communication interface 36 may include one or more cellular radios, Bluetooth, WiFi, near-field communication radios, or other appropriate communication devices for transmitting and receiving information. As can be seen in FIG. 1, communication interface 36 facilitates communication between network 140 and user product(s) 14. Multiple communication interfaces 36 may be included in user device 30 providing multiple forms of communication between user device 30 and user product(s) 14. For example, communication may be achieved by one or more cellular radios and/or WiFi communication between user device 30 and user product(s) 14. Communication also may be achieved through Bluetooth, near-field communication, a wired data connection (e.g., a universal serial bus, an onboard diagnostic system, etc.) or other communication modes.

User device 30 may include hardware configured to sense (measure) and record usage information when user product 14 is operated. For example, user device 30 includes an accelerometer 32 that has one or more individual sensors configured to measure acceleration and deceleration. Accelerometer 32 may include an acceleration measurement chip having a gyroscope sensor and a compass sensor (or magnetometer) to detect orientation and/or heading. Positioning receiver 34 includes, for example, a Global Positioning System receiver configured to determine a location of user device 30. Communication interface 36 may also measure location based on data received from other satellite location systems or communication with a cell tower, for example. Accelerometer 32, positioning receiver 34, and communication interface 36 may independently or collaboratively measure acceleration, deceleration, speed (instantaneous or average), stops, geographic location (e.g., city/state/region), and route (e.g., trip information).

Prior to or as a precondition for acquiring data from accelerometer 32, positioning receiver 34, and/or communication interface 36, user device 30 may determine an identity of user product 14. This may allow user device 30 to associate an operation of user product 14 with a particular user. Thus, data measured by user device 30 may be pertinent to the operation of the user product 14, while data is not measured when the user is, for example, a passenger in a non-user product 16.

An identity of user product 14 may be initially determined when user device 30 first communicates with user product 14. This may be accomplished via Bluetooth pairing, WiFi pairing, etc. This initial identification may include inputting a passphrase, password, encryption key, unique identifier, etc., into user device 30. Any suitable authentication routine may be employed in this initial pairing of user product 14 and user device 30. If the user owns or regularly operates a plurality of user products 14, the initial authentication process may be performed once for each user product 14. Subsequent operations of user product 14 may include identifying user product 14 without the need to re-enter the passphrase, password, or identifier, or may include an abbreviated authentication process. In one embodiment, each subsequent operation of user device 14 following the initial identification are performed without user intervention (e.g., via an automated Bluetooth connection). If necessary or desired, user device 30 may prompt a user to confirm that the operator will perform the operation of user device 14.

Following each initial or subsequent authentication, user device 30 may measure, via accelerometer 32, a magnitude and frequency of acceleration and/or deceleration, and/or other information indicative of driving style (e.g., a tendency to speed, a tendency to repetitively brake, etc.). Information from positioning receiver 34 may also be indicative of driving style. In addition to driving style information, user device 30 may measure, via positioning receiver 34 and/or communication interface 36, geographic location and/or routes that are traveled by user product 14. For example, user product 14 may measure position information that corresponds to a commute or other frequently-traveled routes. This measured information may be provided to personalization processor 50 in an intermittent or continual basis via network 140.

Additional information may be provided to personalization processor 50 from one or more of industry database 60, user account database 70, and maintenance/repair database 80, as described above. Each of these databases 60, 70, and 80 may include one or more storage devices, such as solid-state storage media (e.g., solid state drives and/or removable flash memory), optical storage media (e.g., optical discs), and/or magnetic storage media (e.g., hard disk drives) for storing information.

As described above, industry database 60 may include one or more databases such as cost database 62 and product inventory database 64 which store industry information. Cost database 62 may contain or store cost information (e.g., supplier listing price, average sales price, manufacturer suggested retail price (MSRP), etc.) associated with one or more purchase products. This cost information may include purchase price, fees, sales tax, etc., for each purchase product. Cost database 62 may also store information relevant to the operation of user product 14, such as a database of fueling locations and the prices for fuel at each fueling location at various points in time. Product inventory database 64 may contain or store inventory information for one or more purchase products. This inventory information may include the details (e.g., features, MPG rating, etc.) of each purchase product available for sale and an average operating cost value for one or more purchase products.

When user product 14 and the purchase product are vehicles, the cost information stored in cost database 62 may include at least one of a so-called "out the door price" (a price including all dealership fees and taxes), invoice price, dealer cost, dealer fees, DMV fees (e.g., registration fees), or any other fees associated with the initial purchase of a particular purchase product. Similarly, when the class of products is vehicles, the product inventory database may include information of one or more purchase products available for sale, including make, model, year, trim, options, color, VIN (vehicle identification number), etc. Each piece of information in cost database 62 and product inventory database 64 of industry database 60 may be received and stored by personalization processor 50 via network 140. Thus, personalization processor 50 may store and process information corresponding to one or more purchase products.

As noted above, user account database 70 may include credit account database 72, banking account database 74, and loan database 76, each of which may be provided in a shared database, or as separate databases. Databases 72, 74, and 76 may store industry information including credit usage information (via credit account database 72), banking information (via banking account database 74), or loan information (via loan database 76). Specifically, credit account database 72 may store data representative of the purchase history of a user having one or more credit accounts. This may include fueling purchases, toll purchases, maintenance or repair purchases, insurance payments, or any other relevant purchases or payments. Banking account database 74 may store similar data that is obtained from a banking account of the user when, for example, a bank account debit card is used to make a purchase. Loan database 76 may include data associated with one or more loans associated with user product 14. This data may include financing costs (e.g., principal, interest rates, etc.), loan availability, etc.

Maintenance/repair database 80 may include industry information corresponding to maintenance and repair costs of user product 14. For example, maintenance/repair database 80 may store cost information corresponding to each time user product 14 has been serviced or repaired. This information may indicate a category of service (e.g., routine maintenance), a more specific type of service (e.g., oil repair, tire change, etc.), or repair associated with a manner of operating user product 14 (e.g., collision repair, tire replacement, etc.). A monetary cost of each service or repair performed on user product 14 may be stored in maintenance/repair database 80.

Personalization processor 50 may be a device configured to receive data from user device 30 and databases 60, 70, and 80, to determine (e.g., by calculating) an ACO, that is an ACO for a specific user rather than a generalized population of potential users. Each piece of information described with respect to databases 60, 70, and 80 may be received for user product 14, a second user product 22 associated with a second user, and for one or more purchase products. Personalization processor 50 may be a computer system that determines an ACO for a purchase product and/or user product 14. The ACO determined by personalization processor 50 may be unique to the user associated with user device 30. As can be seen in FIG. 1, personalization processor 50 may be in communication with user device 30, industry database 60, user account database 70, and maintenance/repair database 80 via network 140, which may be the Internet or any other suitable communication infrastructure or network. Personalization processor 50 may include memory, one or more processors, communication interfaces, input devices, and output devices (FIG. 4), in order to determine the ACO based on information received from databases 60, 70, and 80 with user device 30.

Personalization processor 50 may determine an ACO by adding one or more user cost components (UCC) to a baseline value (BV). The BV may be determined by personalization processor 50 based on the information received from industry database 60. In one aspect, BV corresponds to the "out the door price", including all fees associated with the initial purchase of a vehicle. Thus, BV may be received from cost database 62, or may be independently determined by personalization processor 50.

Personalization processor 50 may determine one or more UCCs that are added to BV. Examples of UCCs include a depreciation, a fuel cost, a toll cost, a cost of insurance, a tax cost, a registration cost, a maintenance cost, and a repair cost, each of which may be determined based on usage information from user device 30 and/or based on industry information received from databases 60, 70, and/or 80. The ACO, and each UCC, may cover or encompass a cost over a predetermined period of time, such as five years. In such an example, each UCC may be calculated for a period of five years, and added to the BV, which may be a one-time cost (e.g., purchase price) or a cost corresponding to the five-year period (e.g., payments of the purchase price for five years). In some examples, the ACO for a five-year period calculated by personalization processor 50 may be calculated based on the BV plus the depreciation, fuel cost, toll cost, cost of insurance, tax cost, registration cost, maintenance cost, and repair cost for five years. In one aspect, the period of time over which personalization processor 50 calculates the ACO may be selected by a user by interacting with user device 30.

The ACO, for example, the ACO of a purchase product, may be calculated by personalization processor 50 based on exemplary Equation E1 below. In Equation E1, n represents a number of UCCs that are each added to BV to determine the ACO.

$$ACO = BV + (\Sigma = (UCC_1) + (UCC_2) + (UCC_3) + (UCC_n)) \quad \text{Equation E1:}$$

Each UCC may be determined based on one or more user cost factors (UCF) determined by personalization processor 50. For example, for a UCC that represents the cost of fueling for a period of five years, UCFs may include fuel prices, distance travelled, and fuel economy.

The UCFs may be determined based on measured data representative of behavior or habits of the user operating one or more user products 14 (habit UCFs). Habit UCFs may be related to driving style, and include acceleration/deceleration rate, cornering speed, braking frequency, routes, distance travelled, etc. Habit UCFs may affect depreciation, fuel cost, toll cost, maintenance cost, or other costs. In one example, a fuel cost may be based on a geographic location or a route. This information may be correlated with credit account information or banking account information from databases 72 and 74, respectively. A toll cost may also be determined based on a geographic location or a route, such as a commute. In another example, a depreciation may be increased based on frequent acceleration and/or frequent deceleration (braking). Depreciation may also be increased when a frequency of acceleration and/or deceleration measured by user device 30 is indicative of strong vibrations (e.g., by frequently encountering potholes or other irregular road surfaces).

Other UCFs may be dependent on geographic location, product type, or other factors unrelated to behavior or habits. These UCFs may include region, credit rating, etc., and may affect tax cost, registration cost, insurance cost, or other costs. Each UCF may be determined based on usage information from user device 30.

One or more UCF(s) or UCC(s) may be determined by personalization processor 50 based on data from multiple users. In one aspect, two users may operate similar user products (e.g., user product 14 and user product 22, as shown in FIG. 1). That is, user products 14 and 22 may be user products having the same make, model, year, and/or trim. In another aspect, the two user products 14 and 22 may be related, but include one or more differences (e.g., both user products are hybrid sedans, large trucks, etc.) Usage information for one or more second user products 22 may be received by a user device for one or more additional users (not shown).

Personalization processor 50 may use the information stored in databases 60, 70, and/or 80 for second user associated with second user product 22 to assist in the determination of an ACO for a user (e.g., target user) associated with user product 14. For example, the cost of fuel, insurance cost, and/or maintenance cost UCC may be determined by personalization processor 50 for the second user and used to determine the corresponding UCC for the target user. This may be performed by first determining that the target user of user product 14 and the second user of user product 22 have at least some usage information related or in common. For example, when a geographic location of user products 14 and 22 are the same or within a specified threshold distance of one another, UCCs such as toll cost, and/or tax cost that were determined for second user (e.g., the user of product 22) may be used to determine a corresponding UCC of the target user (e.g., the user of product 14). Similarly, if registration cost, maintenance cost, and repair cost UCC are determined for one user, the UCCs determined for this user may be used as a substitute for a corresponding UCC of another user. Thus, when there is a lack of information for one user (e.g., a target user of user product 14) pertaining to a specified UCC, the UCC for another user (e.g., second user associated with second user product 22) having a similar user product, geographic location, route, and/or driving habits may be used to supplement the information pertaining to the one user.

Additionally, one or more UCFs may be determined for the target user based on the corresponding UCF of another user. For example, when an insurance rate or a cost of fuel for the target user (e.g., a target user of user product 14) is unknown, an insurance rate or a cost of fuel for a second user (e.g., second user associated with second user product 22) with a user product similar to the user product of the target user or a same location as the target user may be used to provide or supplement such information for the target user.

Once each UCC is determined, the UCCs may be added to the BV of a purchase product, as shown in Equation E1, to determine the ACO for the purchase product. This ACO may be presented to the user via user device 30, as will be described in further detail below.

Additionally, the ACO may be calculated for user product 14 (e.g., via Equation E1). That is, once each UCC is determined, the UCCs may be added to the BV of user product 14 to determine the ACO of user product 14. Subsequently, the determined ACO of user product 14, or $ACO_{UP}$, may be compared to an industry or average (operating) cost value for the same product 14 or for a similar product. The industry cost value may be a value received from cost database 62, for example, and may represent a general cost of ownership for a purchase product. As shown in Equation E2 below, an $ACO_{UP}$ for the user product 14 may be divided by an industry cost value for the user product ($ICV_{UP}$) to determine a multiplying factor MF. Accordingly, a magnitude of the difference between the $ACO_{UP}$ and the $ICV_{UP}$, which may be represented by multiplying factor MF, may be determined by personalization processor 50 and provided to user device 30 for display to a user. Multiplying factor MF may represent whether a user is matching an average industry cost value (MF=1), below the average industry cost value (MF<1), or above the average industry cost value (MF>1).

$$MF = \frac{ACO_{UP}}{ICV_{UP}} \quad \text{Equation E2}$$

The magnitude of multiplying factor MF for user product 14 (for example 90% or 0.9 when the $ACO_{up}$ is 10% lower than the average industry cost value) may be applied to an industry or average cost value for a purchase product. Thus, personalization processor 50 may determine an ACO for a purchase product ($ACO_{PP}$) based on the magnitude difference (e.g., 90%) and based on an average industry cost value for a purchase product ($ICV_{PP}$). This may be performed based on exemplary Equation E3 below.

$$ACO_{PP}=MF*ICV_{PP} \quad \text{Equation E3}$$

Thus, personalization processor 50 may determine the ACO for a purchase product, or $ACO_{PP}$, by taking the ACO for the user product, $ACO_{UP}$, into account. That is, $ACO_{PP}$ is based on the ratio (multiplying factor MF) of the ACO for the user product 14 to the average industry cost value for the same user product 14, as shown in Equations E2 and E3. The resulting ACO for the purchase product, $ACO_{PP}$, may be presented to the user via user device 30.

In some arrangements, the above-described $ICV_{PP}$ may be a value received from cost database 62. In other arrangements, however, the $ICV_{PP}$ may be the average ACO (e.g., as determined via Equation E1) for a plurality of users operating a similar purchase product/user product. Thus, an individual owner's ACO for user product 14 (e.g., $ACO_{UP}$) may be compared to an average ACO and used to scale the $ACO_{PP}$. Thus, the ACO may be based on an actual usage of user product 14.

The ACO may also be calculated by personalization processor 50 based on an exemplary Equation E4 below. In Equation E4, each UCC ($UCC_1$, $UCC_2$, etc.) may be scaled by one or more scalars, or scaling factors, represented by A, B, C, etc.

Equation E4

$$ACO=BV+(\Sigma=A(UCC_1)+B(UCC_2)+C(UCC_3)+ \ldots Z(UCC_n))$$

The scalars employed in Equation E4 may allow personalization processor 50 to adjust (increase or decrease) a respective UCC based on the information measured from user device 30 and/or received from at least one of industry database 60, user account database 70, or maintenance/repair database 80. The information of a second user, including the usage information of user product 22 associated with the second user, may be used to determine a scalar that adjusts one or more of the UCCs of the target user. The value of the scalar may be one when one or more of the UCCs are not adjusted. Scalars may be determined based on any usage information measured by accelerometer 32, positioning sensor 34, and/or communication interface 36 of a user device 30 associated with the second user operating a second user device 22.

In order to accurately determine scalars of each UCC, data transmitted from user device 30 and received by personalization processor 50 may allow personalization processor 50 to calculate UCFs that affect one or more UCCs. This data may include one or more of acceleration/deceleration information measured by accelerometer 32, geographic location measured by positioning receiver 34 and/or communication interface 36, route information from accelerometer 32, positioning receiver 34, and/or communication interface 36. For example, based on the usage information received from user device 30, personalization processor 50 may determine that the operator of user device 14 accelerates and decelerates at an increased rate and/or with greater frequency than an average user. Thus, the UCC for fuel cost may be scaled upwards. Similarly, if a route (e.g., commute) of user device 14 includes significant tolls, a corresponding toll cost UCC may be scaled upwards. The scalars may also be performed on the basis of information from industry database 60, user account database 70, and maintenance/repair database 80.

The $ACO_{PP}$ may be calculated based on Equation E4 by determining a value for each UCC for the purchase product. One or more of these UCCs may be determined based on usage information from user device 30 and information from databases 60, 70, and 80, as described above. Thus, personalization processor 50 may calculate an $ACO_{PP}$ by adding one or more scaled UCCs to BV. The resulting $ACO_{PP}$ may be presented to the user via user device 30.

Figure 2:
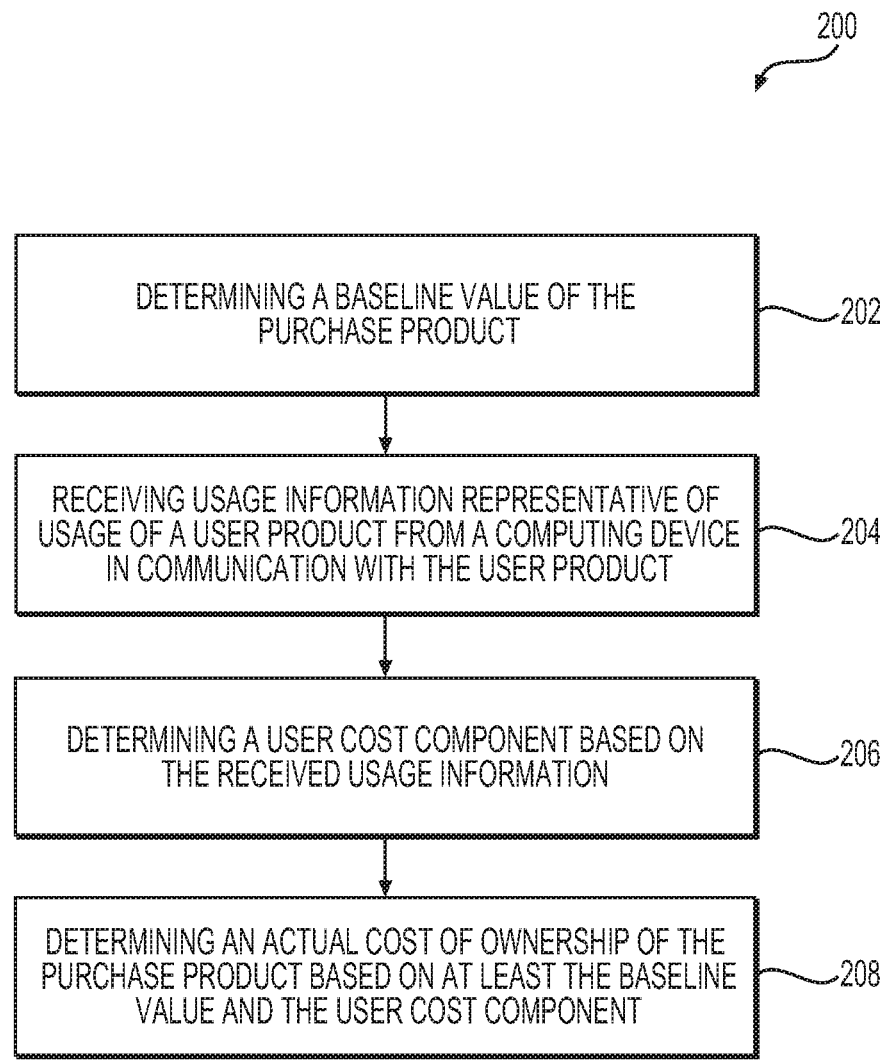
FIG. 2 depicts a flowchart of an exemplary method of determining an actual cost of ownership of a purchase product, according to one or more embodiments.

FIG. 2 is a flowchart illustrating a computer-implemented method 200 for determining $ACO_{PP}$ according to an exemplary embodiment. In one aspect, a purchase product may be a vehicle or a piece of real estate, etc. A first step 202 may include determining a baseline value of the purchase product. An exemplary BV may be obtained from cost database 62, for example. The BV may represent an entire initial cost of a purchase product, including all one-time fees, sales tax, registration costs, etc., in addition to the price charged by the owner or dealer. BV may be a monthly payment for one or more of these elements. Personalization processor 50 may determine the BV based on the type of purchase product. The type may include, for example, make, model, trim, size, or other information.

In a step 204, usage information representative of the usage of a user product 14 may be received by personalization processor 50. This usage information may be information measured by accelerometer 32, positioning sensor 34, and/or communication interface 36 of a computing device, such as user device 30. The usage information from user device 30 may include one or more of acceleration information, deceleration information, speed information, geographic location information, or route information. This information may be periodically received by personalization processor 50 via network 140. Additionally or alternatively, this information may be received after communication between user device 30 and user product 14 has ended or ceased. Thus, in some arrangements, usage information may be received by personalization processor 50 at a time different than a time during which user product 14 is operated and in communication with user device 30.

Step 204 may also include receiving usage information from industry database 60, user account database 70, and/or maintenance/repair database 80. Personalization processor 50 may include any relevant information stored in databases 60, 70, or 80. For example, historical fuel cost information may be received from cost database 62.

In a step 206, personalization processor 50 may determine a user cost component (UCC) based on the received usage information. This may be accomplished by correlating data received from user device 30, industry database 60, user account database 70, and maintenance/repair database 80, with personalization processor 50. For example, a fueling frequency may be determined based on route and location information measured by positioning receiver 34. This information may be correlated with information from credit account database 72 and/or banking account database 74 to determine an amount of fuel purchased. For example, personalization processor 50 may determine that fueling for user product 14 was performed based on one or more occasions at which fuel was purchased (e.g., by the fuel cost information) and user device 14 was present and stationary at a fueling (e.g., gas) station.

Other types of correlated information may be processed by personalization processor 50 to determine a UCC. For example, distance travelled by user product 14 may be determined from the route information from positioning receiver 34, allowing personalization processor 50 to determine a fuel efficiency by correlating this information with fuel purchases.

In step 206, personalization processor 50 may determine a UCC based on the received usage information from user device 30, user account database 70, and/or maintenance/repair database 80, in addition to cost information from industry database 60. In one example, personalization processor 50 may determine a UCC for fuel cost. The fuel cost UCC may be adjusted based on the magnitude of acceleration, deceleration, a frequency of deceleration or stopping, etc., or other measurements made while user product 14 is in operation and which may be associated with fuel costs. For example, if user device 30 measures frequent stops, the fueling cost UCC may be adjusted upward (e.g., by Equation E1 and/or E4). Furthermore, a fuel economy of user product 14 may be determined by personalization processor 50. As user device 30 may provide personalization processor 50 with the identity of user product 14, an expected fuel economy for user product 14 may be known to personalization processor 50, for example from product inventory database 64. The expected fuel economy may then be compared to the actual fuel economy measured by user device 30. For example, the fuel economy may be less than the expected fuel economy (e.g., 10% less). This may be used to scale the fuel cost UCC accordingly (e.g., by increasing the fuel cost UCC with a scaling factor in Equation E4).

Various other UCCs may be determined and/or scaled based on information from user device 30 in a similar manner. For example, depreciation, toll, insurance, tax, and/or registration costs may be determined based on the geographic location or route measured by positioning receiver 34 and received by personalization processor 50. Additionally, acceleration or deceleration information may be used to determine or adjust fuel, insurance, maintenance, and/or repair costs. Information from user account database 70 and/or maintenance/repair database 80 may be used to determine or adjust fuel, insurance, maintenance, or repair cost.

In step 208, an ACO may be determined for one or more purchase products. When the purchase product(s) are vehicles, the ACO may be the determined costs associated with the vehicle for a period of time. In one aspect, step 208 may be performed by calculating the ACO by personalization processor 50 (e.g., by Equation E1). Alternatively, step 208 may include calculating the $ACO_{PP}$ based on Equations E2 and E3, and/or based on Equation E4). The $ACO_{PP}$ may be based one or more UCCs determined for user device 14, as discussed above. An ACO of a purchase product may then be presented to a user, for example, via a display of user device 30.

Figure 3:
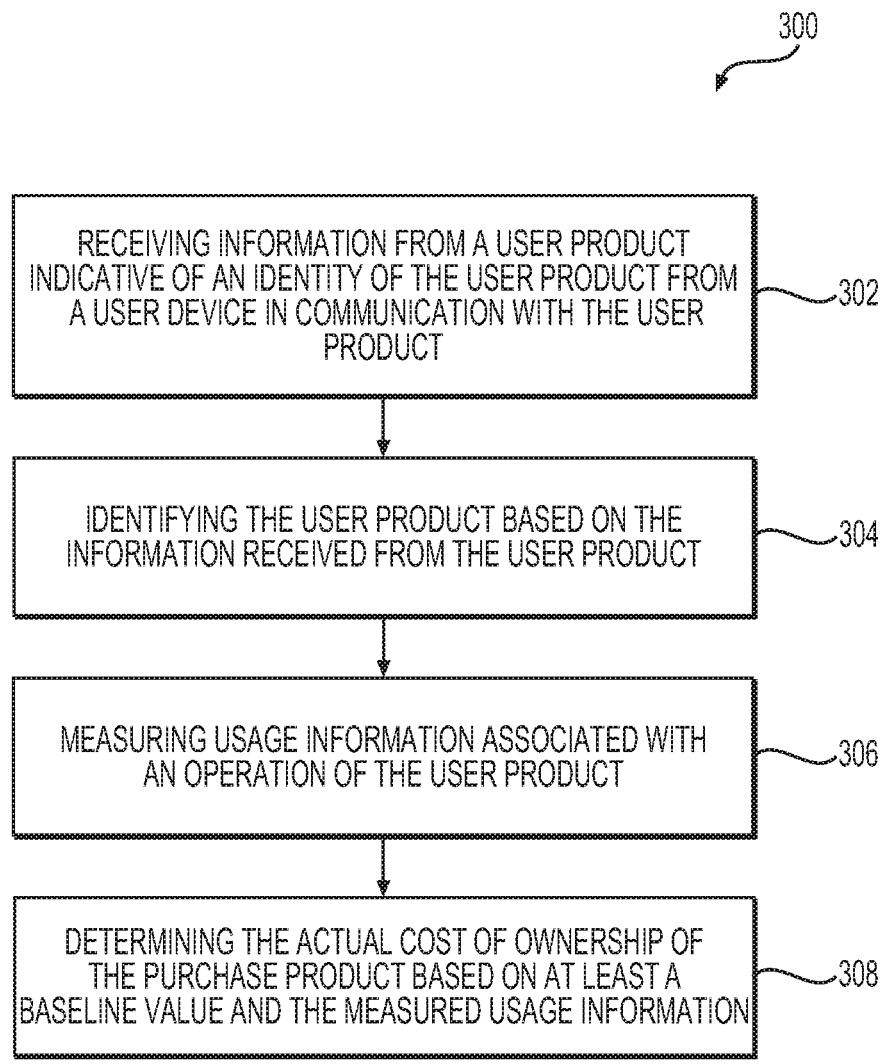
FIG. 3 depicts a flowchart of an exemplary method of determining an actual cost of ownership of a purchase product, according to one or more embodiments.

FIG. 3 is a flowchart illustrating a computer-implemented method 300 for determining an actual cost of ownership of a purchase product according to an exemplary embodiment. In a first step 302 of method 300, an identity of user product 14 may be received by user device 30. For example, user device 30 may receive information indicative of the identity of user product 14. This information may be provided by Bluetooth pairing, WiFi, near-field communication radios, for example, via communication interface 36. Alternatively, information may include an identifier (e.g., a unique alphanumeric string) received by user device 30, or any other manner described herein.

In a step 304, based on the identification information, an identity of user product 14 may be determined by user device 30. The identity of user product 14 may be determined based on a unique identifier or as otherwise described herein. In one aspect, the identity of user product 14 may be determined by correlating identification information received by user device 30 with make, model, and/or trim information. In step 306, which may be performed following a successful identification in step 304, user device 30 measures information during the operation of user product 14. As noted above, this measured information may be acceleration, deceleration, speed, stops, geographic location, and route. Step 306 may be performed in response to the identification performed in step 304. Said differently, step 306 may not be performed when user device 30 is located in a product such as a vehicle that is not under the operation of the user associated with user device 30.

In step 308, an ACO for a purchase product ($ACO_{PP}$) may be determined. In an aspect, the $ACO_{PP}$ may be calculated by personalization processor 50 and provided to user device 30 via network 140. Thus, user device 30 may determine the $ACO_{PP}$ by receiving the $ACO_{PP}$ calculated by personalization processor 50. Step 308 may include displaying the $ACO_{pp}$ to a user via a display (e.g., output device 460, FIG. 4) of user device 30. The $ACO_{pp}$ may be shown as a single value or as one or more values. For example, multiple values that each correspond to a respective UCC for the purchase product may be displayed. Specifically, the $ACO_{PP}$ may be presented as a displayed BV and one or more values for a depreciation, a fuel cost, a toll cost, a cost of insurance, a tax cost, a registration cost, a maintenance cost, or a repair cost. Additionally, the $ACO_{pp}$ and one or more UCCs may be determined and displayed as a cost over a daily, weekly, biweekly, monthly, bi-monthly, annual, 2-year, 3-year, 5-year, or other period of time.

Figure 4:
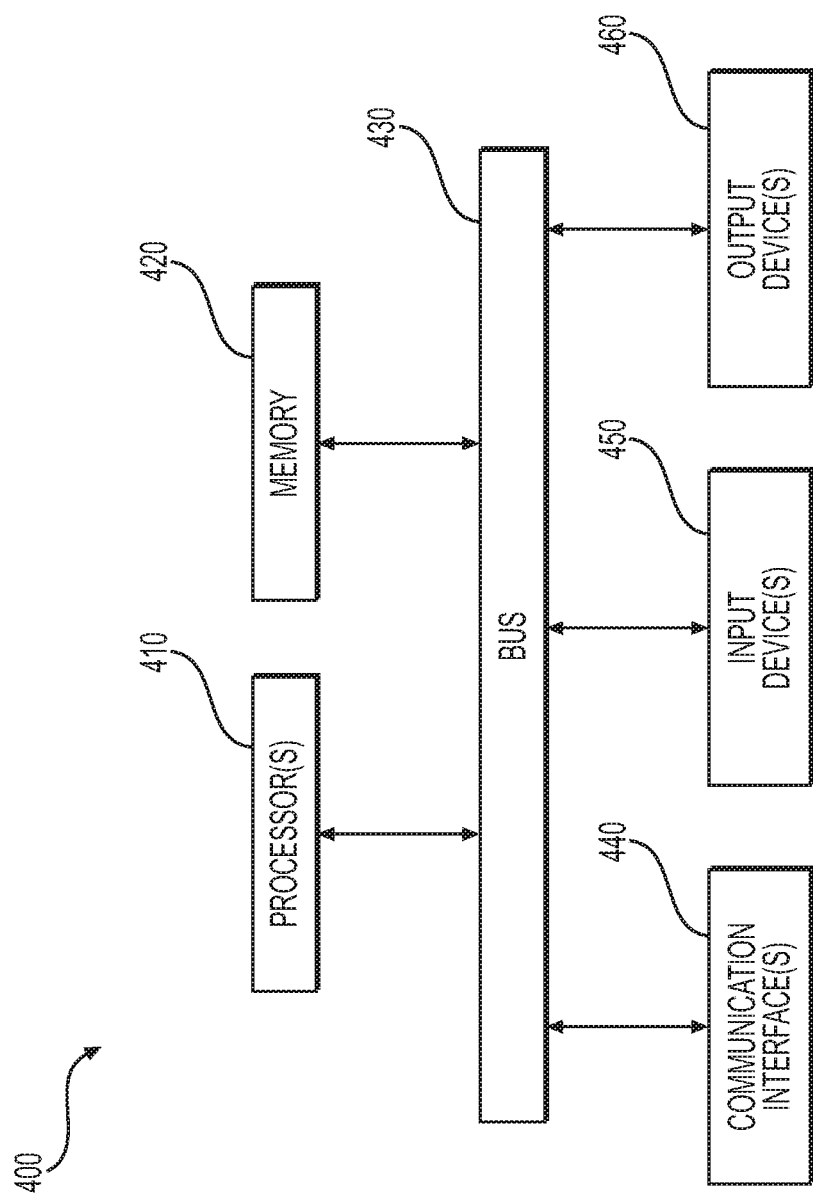
FIG. 4 depicts an example of a computing device, according to one or more embodiments.

FIG. 4 illustrates an example of a computing device 400 such as user device 30, and/or personalization processor 50. Computing device 400 may include processor(s) 410 (e.g., CPU, GPU, or other such processing unit(s)), a memory 420, and communication interface(s) 440 (e.g., a network interface) to communicate with other devices. Memory 420 may include volatile memory, such as RAM, and/or non-volatile memory, such as ROM and storage media. Examples of storage media include solid-state storage media (e.g., solid state drives and/or removable flash memory), optical storage media (e.g., optical discs), and/or magnetic storage media (e.g., hard disk drives). The aforementioned instructions (e.g., software or computer-readable code) may be stored in any volatile and/or non-volatile memory component of memory 420. The computing device 400 may, in some embodiments, further include input device(s) 450 (e.g., a keyboard, mouse, or touchscreen) and output device(s) 460 (e.g., a display, printer). The aforementioned elements of the computing device 400 may be connected to one another through a bus 430, which represents one or more busses. In some embodiments, the processor(s) 410 of the computing device 400 includes both a CPU and a GPU.

FIG. 4 is a diagram illustrating a computing device 400. Computing device 400 is an exemplary computer system and may include one or more computing devices. If the one or more processors 410 of the computer system 400 are implemented as a plurality of processors, the plurality of processors 410 may be included in a single computing device or distributed among a plurality of computing devices. If computer system 400 includes a plurality of computing devices, the memory 420 of the computer system 400 may include the respective memory of each computing device of the plurality of computing devices.

In general, any process discussed in this disclosure that is understood to be computer-implementable, such as methods 200 and 300, may be performed by one or more processors of a computer system, such as computer system 400, as described above. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

Regarding user device 30, accelerometer 32 and positioning receiver 34 may provide information that is processed by processor 410 and output via communication interface 36 (an exemplary communication interface 440). User device 30 may include an output device 460 in the form of a display. This display may be a touchscreen device and thereby also form an exemplary input device 450. The output device 460 of user device 30 may provide the ACO for a purchase product to the user. In one embodiment, the ACO is determined for a plurality of purchase products. Thus, the user may readily compare the ACOs for multiple purchase products.

The methods and systems described herein may determine an ACO for a particular purchase product, such as a vehicle. This may allow a user to determine how a purchase product may increase or decrease spending over a period of time, and assist the user in understanding how a purchase product may affect the ability to absorb other costs (e.g., rent, groceries, childcare, etc.). Thus, a user is able to receive an accurate estimate of the ACO when determining how a purchase product will affect a budget.

Instructions executable by one or more processors may be stored on a non-transitory computer-readable medium. Therefore, whenever a computer-implemented method is described in this disclosure, this disclosure shall also be understood as describing a non-transitory computer-readable medium storing instructions that, when executed by one or more processors, cause the one or more processors to perform the computer-implemented method. Examples of non-transitory computer-readable medium include RAM, ROM, solid-state storage media (e.g., solid state drives), optical storage media (e.g., optical discs), and magnetic storage media (e.g., hard disk drives). A non-transitory computer-readable medium may be part of the memory of a computer system or separate from any computer system.

It should be appreciated that in the above description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the disclosure, and it is intended to claim all such changes and modifications as falling within the scope of the disclosure. For example, functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted.

What is claimed is:

1. A computer-implemented method for determining an actual cost of ownership of a purchase product, the method comprising:
   determining a baseline value of the purchase product;
   receiving usage information representative of usage of a user product from a computing device associated with a first user, the computing device being in radio communication with the user product after the computing device identifies the user product by radio communication with the user product, the computing device having an accelerometer and a global positioning system receiver, the usage information including acceleration information measured by the accelerometer and route information measured by the global positioning system receiver included in the computing device, wherein the usage information is measured based on the identification of the user product by the computing device, and
   wherein the purchase product and the user product belong to a same class of products;
   determining a first user cost component based on the acceleration information included in the received usage information measured by the accelerometer in the computing device, the first user cost component including a depreciation, the depreciation being determined based on vibration indicative of road disturbances, the vibration being measured with the accelerometer and included in the acceleration information;
   determining a second user cost component based on the route information included in the received usage information measured by the global positioning system receiver in the computing device,
   wherein the second user cost component includes a fuel cost or a toll cost and the route information includes a distance;
   determining that a first additional user cost component associated with the first user is unavailable;
   identifying a second user that is associated with a second additional cost component and that has a common geographic location with the first user;

in response to determining that the first additional user cost component is unavailable and determining that the second user has the common geographic location with the first user, determining that the second additional user cost component associated with the second user corresponds to the first additional user cost component; and determining an actual cost of ownership of the purchase product based on at least the baseline value, the first user cost component, the second user cost component, and the second additional user cost component.

2. The method of claim 1, further including receiving industry information including at least one of a credit usage information, banking information, or loan information; and
wherein the second user cost component includes at least the fuel cost, the fuel cost being determined based on the received industry information.

3. The method of claim 1, wherein the user product is a first user product, and the second user is associated with a second user product, the first user and the second user having at least one related route, fueling frequency, fueling cost, repair history, or insurance cost.

4. The method of claim 3, wherein the first user product and the second user product belong to a same classification.

5. The method of claim 1, wherein determining the actual cost of ownership includes summing a plurality of user cost components, the method further including adjusting one user cost component of the plurality of user cost components by multiplying the one user cost component by a scaling value.

6. The method of claim 1, wherein the second user cost component includes a plurality of user cost components that includes the fuel cost and the toll cost.

7. The method of claim 6, further including receiving at least a credit use information or a banking use information, wherein the fuel cost is determined based on at least the route information, the fuel cost further being determined based on the credit use information or the banking use information.

8. The method of claim 1, wherein the radio communication is Bluetooth communication, WiFi communication, or near-field communication.

9. The method of claim 1, further including:
receiving industry information including at least one of a credit usage information, banking information, or loan information; and
determining a third user cost component based on the acceleration information and the received industry information, wherein the third user cost component includes a repair cost.

10. The method of claim 1, wherein the second user cost component includes the fuel cost, and wherein the method further includes scaling the fuel cost upwards based on the acceleration information included in the usage information.

11. The method of claim 1, wherein the second user cost component includes the fuel cost, and wherein the second additional cost component includes the toll cost or a registration cost.

12. A computer-implemented method for determining an actual cost of ownership of a purchase product, the method comprising:
receiving information, at a computing device, from a user product indicative of an identity of the user product by radio communication between the computing device and the user product, the user product being associated with a first user, the user product and the purchase product belonging to a same class of products;
identifying, with the computing device, the user product based on the information received from the user product via the radio communication;
measuring usage information associated with an operation of the user product after the computing device identifies the user product via the radio communication, the computing device having an accelerometer and a global positioning system receiver, the usage information including acceleration information measured by the accelerometer and route information measured by the global positioning system receiver included in the computing device, wherein the usage information is measured based on the identification of the user product by the computing device;
determining that at least one user cost component for a toll cost or a registration cost associated with the first user is unavailable;
identifying a second user that is associated with a substitute user cost component and that has a common geographic location with the first user;
determining the actual cost of ownership of the purchase product based on at least a baseline value, a first user cost component, and a second user cost component, and by using the substitute user cost component associated with the second user as a substitute for the at least one user cost component based on determining that the at least one user cost component associated with the first user is unavailable and determining that the second user has the common geographic location with the first user,
wherein the first user cost component is calculated based on the acceleration information included in the usage information measured by the accelerometer in the computing device, the second user cost component is determined based on the route information included in the usage information measured by the global positioning system receiver in the computing device, and the second user cost component includes a fuel cost and the route information includes a distance, and
wherein the first user cost component includes a depreciation, the depreciation being determined based on vibration indicative of road disturbances, the vibration being measured with the accelerometer and included in the acceleration information.

13. The method of claim 12, wherein the user product is a first user product, and the measuring usage information includes measuring usage information associated with operation of the first user product and with operation of a second user product different than the first user product, based on a determined identity of the first user product and a determined identity the second user product.

14. The method of claim 12, wherein the user product is a first user product, and the measuring usage information includes measuring usage information associated with operation of the first user product and does not include measuring usage information associated with operation of a second user product, based on a determined identity of the first user product and a determined identity of the second user product.

15. The method of claim 12, wherein the method further includes determining, based on an identity of an additional product, that acceleration will not be measured, and
wherein the user product and the additional product are vehicles.

16. The method of claim 12, wherein the usage information further includes a geographic location measured by the global positioning system receiver.

17. The method of claim 12, wherein the class of products is vehicles.

18. The method of claim 12, wherein the user product is a user vehicle, and the usage information includes information indicating that the user vehicle is located at a fueling station.

19. A system for determining an actual cost of ownership of a purchase product, the system comprising:
- a memory storing instructions; and
- at least one processor executing the instructions to perform a process including:
  - determining a baseline value of the purchase product;
  - receiving usage information representative of usage of a user product including acceleration information measured by an accelerometer and route information measured by a global positioning system receiver of a computing device after the computing device identifies the user product via radio communication with the user product, the computing device being associated with a first user,
- the purchase product and the user product belonging to a same class of products, wherein the usage information is measured by the computing device in response to the identification of the user product by the computing device;
  - determining a plurality of user cost components based on the received usage information, including a first user cost component determined based on the acceleration measured by the accelerometer and a second user cost component determined based on route information measured by the global positioning system receiver in the computing device, wherein the first user cost component includes a depreciation, the depreciation being determined based on vibration indicative of road disturbances, the vibration being measured with the accelerometer, and wherein the second user cost component includes a fuel cost or a toll cost and the route information includes a distance;
- determining that an additional user cost component associated with the first user is unavailable;
- identifying a second user that is associated with a second additional cost component and that has a common geographic location with the first user;
- in response to determining that the first additional user cost component is unavailable and determining that the second user has the common geographic location with the first user, determining that the second additional user cost component associated with the second user corresponds to the first additional cost component; and
- determining the actual cost of ownership of the purchase product based on at least the baseline value, the plurality of user cost components, and the second additional user cost component.

\* \* \* \* \*